United States Patent [19]

Gritters et al.

[11] Patent Number: 4,776,961

[45] Date of Patent: Oct. 11, 1988

[54] PROCESS FOR TREATING GEOTHERMAL BRINE IN TWO PHASE BRINE SEPARATORS

[75] Inventors: Gregory A. Gritters, Bermuda Dunes; John L. Featherstone; Jessie P. Reverente, both of El Centro, all of Calif.

[73] Assignee: Union Oil Co. of California, Los Angeles, Calif.

[21] Appl. No.: 75,267

[22] Filed: Jul. 17, 1987

Related U.S. Application Data

[63] Continuation of Ser. No. 803,382, Nov. 29, 1985, abandoned.

[51] Int. Cl.$^4$ .................... B01D 17/00; B01D 21/00
[52] U.S. Cl. ................................. 210/713; 210/714; 210/738; 210/747; 210/749
[58] Field of Search ............... 210/170, 713, 714, 738, 210/747, 749; 60/641.2, 641.5; 252/358

[56] References Cited

U.S. PATENT DOCUMENTS

| | | | |
|---|---|---|---|
| 2,575,276 | 11/1951 | Jacoby et al. | 252/358 |
| 2,575,298 | 11/1951 | Ryznar | 252/358 |
| 3,893,299 | 7/1975 | Hutchinson et al. | 60/641 |
| 4,016,075 | 4/1977 | Wilkens | 210/714 |
| 4,104,186 | 8/1978 | Caffarel et al. | 252/358 |
| 4,370,858 | 2/1983 | Awerbuch et al. | 60/641.5 |
| 4,405,463 | 9/1983 | Jost et al. | 210/712 |
| 4,429,535 | 2/1984 | Featherstone | 60/641.5 |

OTHER PUBLICATIONS

A Cost-Effective Treatment System for the Stabilization of Spent Geothermal Brines, Featherstone, et al. (Publication unknown).

Stabilization of Highly Saline Geothermalbrines, Featherstone, et al., SPE report No. 8269 (undated).

Primary Examiner—Frank Sever
Attorney, Agent, or Firm—Walter A. Hackler

[57] ABSTRACT

A process for treating hot, pressurized geothermal brine in a liquid-vapor phase separator comprises contacting the brine in the separator with between about 0.2 and about 1.5 parts per million of a defoaming agent so as to substantially reduce the amount of foaming in the separator caused, in part, by steam bubbling through the brine. The preferred defoaming agents are polyglycols having molecular weights between about 1000 and about 2500, those agents having molecular weights below about 1000 being too volatile and those above about 2500 being too difficult to solubilize in the brine. If the separator comprises a draft tube-type flash crystallizer in which silica-rich geothermal brine is contacted with a seed material onto which silica from the brine deposits, the process additionally includes establishing and maintaining a brine level in the crystallizer causing circulation of the brine at a rate substantially reducing the rate of silicious scaling of inner walls of the crystallizer which would result in the absence of brine circulation, the established and maintained brine level being such that in the absence of the defoaming agent, excessive amounts of brine in the form of foam would be carried over into steam discharged from the crystallizer. In preexisting separators in which a design steam production rate cannot be attained because of brine foaming, the addition of a defoaming agent by the present process may enable steam production at a rate greater than the design rate.

20 Claims, 3 Drawing Sheets

PROCESS FOR TREATING GEOTHERMAL BRINE IN TWO PHASE BRINE SEPARATORS

This application is a continuation of application Ser. No. 803,382, filed Nov. 29, 1985 now abandoned.

BACKGROUND OF THE INVENTION

1. Field of the Invention

The present invention relates generally to the production of stream from geothermal brine and especially to such processes in which hot, pressurized, silica-rich geothermal brine is flashed to a reduced pressure to produce stream and in which the flashed brine is contacted with a seed material onto which silica is deposited from the brine.

2. Discussion of the Prior Art

Large subterranean aquifers of naturally produced (geothermal) steam or hot aqueous liquids, specifically water or brine, are found throughout the world. These aquifers, which often have vast amounts of energy potential, are most commonly found where the earth's near-surface thermal gradient is abnormally high, as evidenced by unusually great volcanic, fumarole or geyser activity. Thus, as an example, geothermal aquifers are not uncommon along the rim of the Pacific Ocean, long known for its volcanic activity.

Geothermal stream or water has, in some regions of the world, been used for centuries for therapeutic treatment of physical infirmities and diseases. In other regions, such geothermal fluids have long been used to heat dwellings and in industrial processes. Although efforts to further develop geothermal resources for these site-restrictive uses continue, considerable recent research and development has, additionally, been directed to exploitation of geothermal resources for production of electrical power which can be conducted, often over existing power grids, for long distances from the geothermal sources. In particular, recent steep increases in the cost of petroleum products used for conventional production of electric power, as well as actual or threatened petroleum fuel shortages or embargos, have intensified the interest in use of geothermal fluids as an alternative and generally self-renewing source of power plant "fuel".

General processes by which geothermal fluids can be used to generate electric power are known and have been known for some time. As an example, geothermal steam, after removal of particulate matter and polluting gases, such as hydrogen sulfide and ammonia, can be used in the manner of boiler-generated steam to operate steam turbine generators.

Naturally pressurized geothermal brine or water having a temperature of over about 400° F. can be flashed to a reduced pressure to convert some of the brine or water to steam. The steam produced in this manner can then be used to drive steam turbine generators. The flashed geothermal liquid and the steam condensate obtained from power generation are typically reinjected into the ground to replenish the aquifer and prevent ground subsidence. Cooler geothermal brine or water can often be used to advantage in brine systems in which a low-boiling point, secondary liquid is vaporized by the hot geothermal liquid, the vapor produced being used to operate gas turbine generators. The cooled brine is typically reinjected into the ground.

As might be expected, use of geothermal steam is preferred over use of geothermal water or brine for generating electric power because the steam can be used more directly, easily and cheaply. Consequently, where readily and abundantly available, geothermal steam has been used for a number of years to generate commercially important amounts of electric power at favorable costs. For example, by the late 1970's, geothermal steam at The Geysers in Northern California was generating about two percent of all the electricity used in California.

While energy production facilities at important geothermal steam sources, such as at The Geysers, are still being expanded, when not already at capacity, the known number of important geothermal steam aquifers is small compared to that of geothermal brine or water. Current estimates are, in fact, that good geothermal brine or water sources are about five times more prevalent than are good sources of geothermal steam. The potential for generating electric power is, therefore, much greater for geothermal brine and water than it is for geothermal steam. As a result, considerable current geothermal research is understandably directed towards the development of economical geothermal brine and water electric power generating plants, much of this effort being expended towards the use of vast geothermal brine resources in the Imperial Valley of southern California.

Although, as above mentioned, general processes are known for using geothermal brine or water for production of electric power, serious problems, especially with the use of highly saline geothermal brine, have often been encountered in practice. These problems have frequently been so great as to prevent the production of electric power at competitive rates and, as a consequence, have greatly impeded the progress of flashed geothermal brine power plant development in many areas.

These severe problems are caused primarily by the typically complex composition of geothermal brines. At natural aquifer temperatures in excess of about 400° F. and pressures in the typical range of 400 to 500 psig, the brine leaches large amounts of salts, minerals and elements from the aquifer formation, the brine presumably being in chemical equilibrium with the formation. Thus, although brine composition may vary from aquifer to aquifer, wellhead brine typically contains very high levels of dissolved silica, as well as substantial levels of dissolved heavy metals such as lead, copper, zinc, iron and cadmium. In addition, many other impurities, particulate matter and dissolved gases are present in most geothermal brines.

As natural brine pressure and temperature are substantially reduced in power plant steam production (flashing) stages, chemical equilibrium of the brine is disturbed and saturation levels of impurities in the brine are typically exceeded. This causes impurities and silica to precipitate from the brine, as a tough scale, onto surrounding equipment walls and in reinjection wells, often at a rate of several inches in thickness per month. Assuming, as is common, that the brine is supersaturated with silica at the wellhead, in high temperature portions of the brine handling system, for example, in the high pressure brine flashing vessels, heavy metal sulfide and silicate scaling typically predominates. In lower temperature portions of the system, for example, in atmospheric flashing vessels, amorphous silica and hydrated ferric oxide scaling has been found to predominate. Scale, so formed, typically comprises iron-rich silicates, and is usually very difficult, costly and time consuming to remove from equipment. Because of the fast growing scale rates, extensive facility down time for descaling operations may, unless scale reducing processes are used, be required. Associated injection wells may also require frequent and extensive rework and new injection wells may, from time to time, have to be drilled at great cost.

Therefore, considerable effort has been, and is being, directed towards developing effective processes for eliminating, or at least very substantially reducing, silica scaling in flashed geothermal brine handling systems. One such scale reduction process disclosed in U.S. Pat. No. 4,370,858 to Awerbuck, et al, involves the induced precipitation of scale-forming materials, notably silica, from the brine in the flashing stage by contacting the flashed brine with silica or silica-rich seed crystals. When the amount of silica which can remain in the brine is exceeded by the brine being flashed to a reduced pressure, silica leaving solution in the brine deposits onto the seed crystals. Not only do the vast number of micron-sized seed crystals introduced into the flashing stage provide a very much larger surface area than the exposed surfaces of the flashing vessels but also the silica from the brine tends to preferentially deposit onto the seed crystals for chemical reasons. Substantially all of the silica leaving the brine therefore precipitates onto the seed crystals instead of precipitating as scale onto vessel and equipment walls and in injection wells.

Preferably, the seed crystals are introduced into the high pressure flashing vessel, or crystallizer, wherein high pressure, two phase brine is separated. The silica removal or crystallization process, although commencing in the high pressure flash crystallizer, continues in successive, lower pressure flashing vessels in which additional two phase brine separation occurs. In a downstream reactor-clarifier, the silicious precipitate is separated from the brine as a slurry which may contain about 30 percent by weight of silica. According to known processes, a portion of this silicious slurry from the reactor-clarifier stage is recirculated back upstream into the high pressure flash crystallizer, wherein the silica material in the slurry acts as seed material.

After subsequent filtering to remove fine silicious particles not removed in the reactor-clarifier stage, the "clarifier" brine is commonly reinjected into the ground in an injection stage.

As above-mentioned, geothermal brines used for electric power generation are, at wellhead temperature and pressure, frequently saturated or even supersaturated with silica. As a consequence, substantial amounts of silica must be precipitated from the brine onto the seed material in the flash crystallization stage in order to prevent silica scaling in downstream brine handling equipment. Such removal of silica from the geothermal brine requires, particularly for high brine flow rates associated with production of reasonably large amounts of power, effective and rapid silica precipitation so that brine residence time in the flash crystallizer vessels, as determined by vessel capacity, can be maintained within acceptable and practical limits.

Such known silica seeding processes which utilize flash crystallizers to produce steam and control equipment scaling have, however, been found to have serious problems when implemented into a steam generating facility for providing geothermally derived steam to a power plant. Many of these problems relate to design and operation of flash crystallizers, in particular, high pressure flash crystallizer stages in which the geothermal brine is flashed to a substantially reduced pressure.

Flash crystallizers are typically constructed having an upright, cylindrically-shaped outer shell, in lower regions of which is installed a cylindrical draft tube. Provision is made for introducing brine into the crystallizer through the bottom of the draft tube. The upright draft tube is constructed sufficiently long (in the vertical direction) that upwelling of the brine and steam bubbles through the tube causes a natural, vertical circulation of the brine around and through the draft tube where the seed material is introduced (or is formed in situ). Such brine circulation, which is dependent upon brine level in the crystallizer, is intended to provide prolonged contact of brine with the seed material, thereby affording time for silica to deposit from the brine onto the seed material. Ordinarily, flash crystallizers of the above-described type are intended to operate with a brine level at about the top of the draft tube. Differential pressure controlled valves, which may also be flashing valves, downstream of the flash crystallizer are provided for maintaining a given brine level in the crystallizer even though brine flow rates into the crystallizer may vary with time.

A space, usually about 6 to 10 feet high, is typically provided above the top of the draft tube in which the produced steam is demisted. In this regard, the associated power generating facility usually places limits on the amount of total dissolved solids (TDS) which may be present in the steam provided to it, the amount of TDS in the steam being generally indicative of the amount of brine carryover into the steam. When the allowed TDS level in the steam is exceeded, the power generating facility may be taken off line and the steam must then be discharged into the atmosphere, at a great waste of energy and at a great cost, until the steam TDS level is returned to within limits.

It has, however, been found in some operations that such draft tube-type, high pressure flash crystallizers have been unable to be operated at a brine level providing sufficient brine circulation to prevent excessive silica scaling of internal walls of the crystallizer without causing an excessive amount of brine carryover into the produced steam, as evidenced by excessively high steam TDS levels. Conversely, when the high pressure flash crystallizers are operated at brine levels which do not cause excessive brine carryover into the produced steam, brine circulation has ceased and the rate of silica scaling of inner vessel walls has been excessive, resulting in greatly increased costs of scale removal.

It has generally been supposed that the excessive brine carryover into the steam, at a brine level at the top of the draft tube, was an inherent characteristic of the brine steam separation process within high pressure flash crystallizers, there usually being no corresponding problems associated with low pressure flash crystallizers.

As a consequence, some new-design, high pressure flash crystallizers provide a substantially heightened space above the top of the draft tube to permit more height for steam demisting. Such designs, however, add greatly to the size and cost of the high pressure flash crystallizers and, upon installation, increase the cost of necessary piping.

Very importantly, the present inventors have determined that the problems associated with operation of preexisting high pressure flash crystallizers have unexpectedly been caused by severe foaming of the brine in the crystallizers, such foaming being greatly enhanced by the pressure within the crystallizer and by action of the steam bubbling through the brine after steam production. Such brine foaming had not before been seen in high pressure flash crystallizers because of their closed construction, and was unexpected because no significant amount of brine foaming had been seen in open portions of the steam producing facility.

Thus, the present inventors have discovered that when the brine level in the high pressure flash crystallizers was at the top of the draft tube, as intended, a thick blanket of foam extended upwardly from the top of the brine into the open region above the draft tube. The carryover into the produced steam, causing high steam TDS levels, was thus apparently a carryover of the foam. Further, it was discovered by the present inventors that because of the thick layer of foam produced in the flash crystallizer, the apparent brine level in the crystallizer, as determined by pressure measurements made at different crystallizer heights, was always greater than the actual height of the brine in the crystallizer. That is, the actual brine height was always lower than the indicated height, the indicated height being used, however, to control brine flow from the crystallizer. As a result, brine circulation in the crystallizer was always less than indicated or believed.

An object of the present invention is, therefore, to provide a process for treating geothermal brine in two phase brine separation vessels by reducing brine foaming.

Another object of the present invention is to provide a process for reducing the foaming of and the scaling by silica-rich geothermal brine in flash crystallizers, particularly in high pressure flash crystallizers.

Still another object of the present invention is to provide a process for reducing the foaming of and the scaling by a silica-rich geothermal brine in a high pressure flash crystallizer, the process including contacting the brine in the crystallizer with a defoaming agent and establishing and maintaining a brine level in the crystallizer which assures sufficient brine circulation to substantially reduce the silica scaling on inner walls of the crystallizer over that which would otherwise occur in the absence of brine circulation.

Other objects, advantages and features of the present invention will become apparent to those skilled in the art from the following description, when taken in conjunction with the accompanying drawings.

SUMMARY OF THE INVENTION

According to the present invention, there is provided a process for treating hot, pressurized geothermal brine in a brine liquid-vapor phase separating vessel. The process comprises contacting the brine with a defoaming agent in a preferred amount of about 0.2 to about 1.5 parts per million of defoaming agent to brine, and intermixing the brine and defoaming agent in the separating vessel so as to substantially reduce the amount of foam produced by the brine therein over that amount which would otherwise have been formed by the brine in the absence of the defoaming agent.

According to a preferred embodiment, the geothermal brine in the separating vessel is at a temperature of at least about 300° F., The defoaming agent may comprise an organosilicon polymer, but preferably is selected from the group consisting essentially of polyethylene glycols, polypropylene glycols and combinations thereof having molecular weights in the preferred range of between about 1000 and about 2500.

In an embodiment of the invention, the geothermal brine is silica rich, the separating vessel then comprising a flash crystallizer vessel in which the brine is contacted with a seed material onto which silica is deposited from the brine to thereby reduce the silica scaling of the vessel and of downstream brine handling equipment by the brine, the crystallizer vessel being constructed having a draft tube and a steam outlet port at an elevation above the top of the draft tube. In such case, the process includes establishing and maintaining a brine level in the vessel at a height relative to the draft tube which causes the brine to circulate within the vessel at a velocity causing the rate of silica scale formation on inner walls of the vessel to be substantially reduced over that which would otherwise occur in the absence of brine circulation in the vessel. The established and maintained brine height in the vessel is such that in the absence of the addition of deforming agent to the brine, substantial amounts of foam caused by the brine would be carried over into steam discharged from the vessel through the steam discharge port. Preferably the defoaming agent is added to the brine before the brine is introduced into the vessel. In the flash crystallizer vessel the brine temperature may be at least about 300° F. and the brine pressure may be at least about 50 psig. In one case, the brine temperature may be about 375° F. and the brine pressure may be about 110 psig.

The brine level in the flash crystallizer vessel may preferably be established and maintained at a height at least about equal to the height of the top of a draft tube mounted within the vessel and may more preferably be at least about two feet above the top of the draft tube.

When the separation vessel is a preexisting vessel having a design steam production rate, the present process typically enables the actual steam production rate to be substantially increased over the design production rate because of the reduction of foaming in the vessel.

BRIEF DESCRIPTION OF THE DRAWINGS

The present invention will be more readily understood by reference to the drawings in which.

DESCRIPTION OF THE PREFERRED EMBODIMENT

Figure 1A:
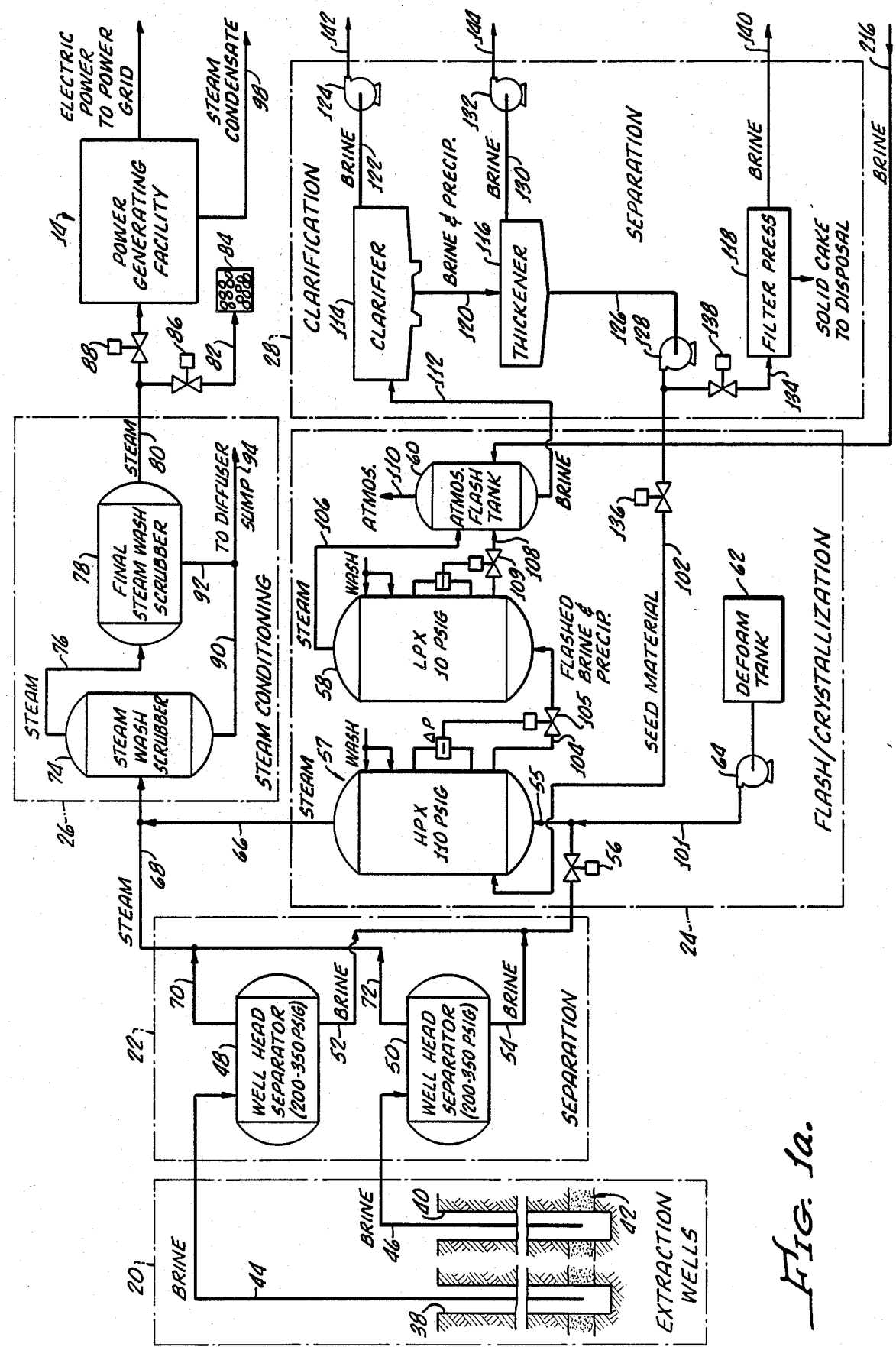
FIG. 1a showing part of the power plant and FIG. 1b showing the remainder of the power plant.

The present process for treating geothermal brine in a two phase brine separator, and more specifically for reducing the foaming of and the scaling by geothermal brine, principally in high pressure flash crystallizers, can be better understood by the consideration of an exemplary geothermal brine power plant in which the process may be used to advantage. Shown, therefore, in simplified form in FIGS. 1a and 1b is an exemplary geothermal brine power plant 10 which comprises generally a brine handling portion 12 and an associated electric power generating portion 14.

In general, the function of brine handling portion 12 is the extraction of hot pressurized geothermal brine from the ground; conversion, by a flashing process, of part of the brine to steam for use by power generating portion 14 and reinjection into the ground of the flashed brine and of steam condensate (if any) returned from the power plant portion. Function of power generating portion 14 is the use of steam from brine handling portion 12 for the production of electric power.

Brine handling portion 12 comprises generally a brine extraction stage 20, (FIG. 1a), a wellhead separation stage 22, a steam production (flashing) and silica crystallization stage 24 in which the present process is practiced, a steam conditioning stage 26, a brine clarification stage 28, a brine filtering stage 30 (FIG. 1b) and a brine reinjection stage 32.

Figure 1B:
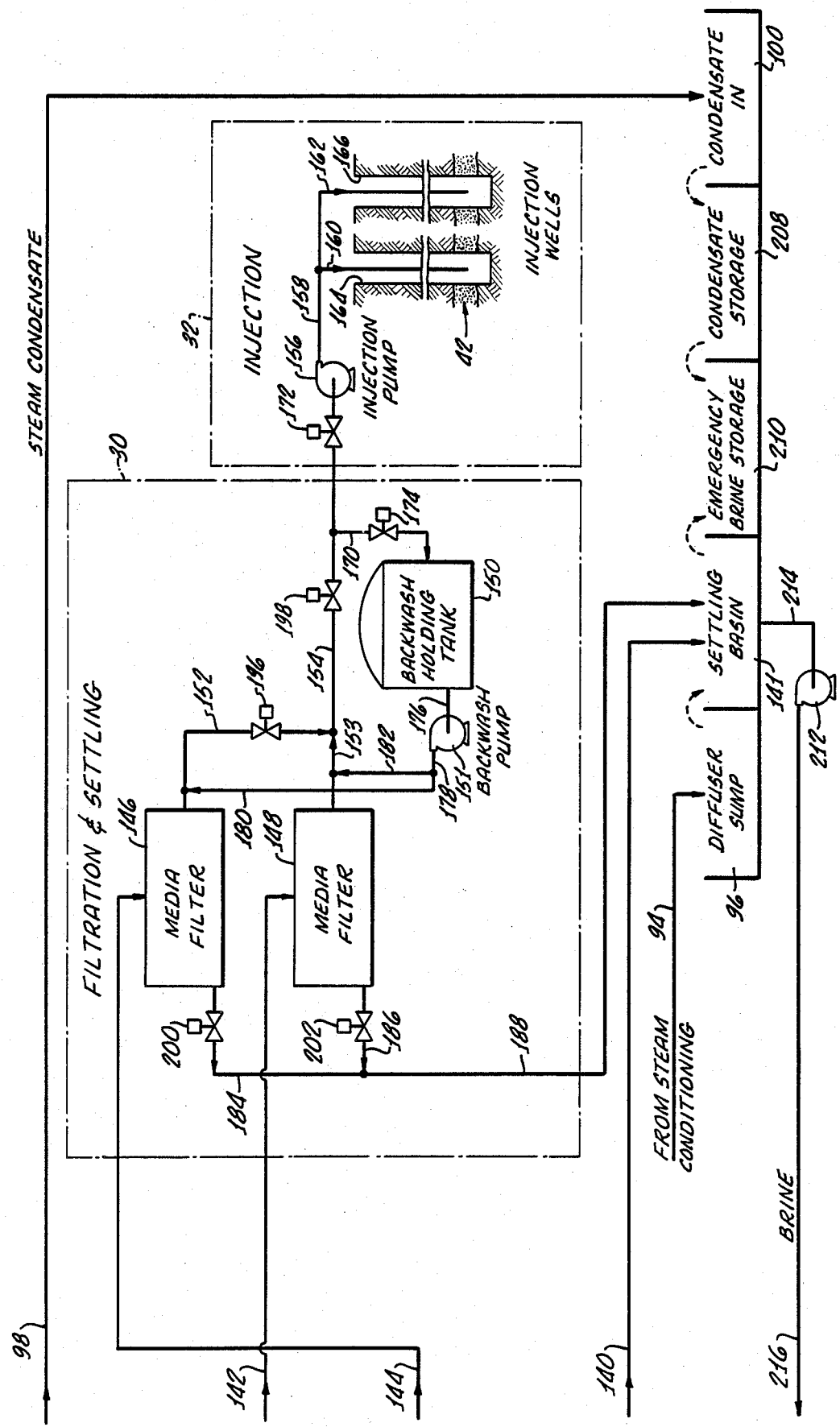
FIG. 1 is a simplified diagram of an exemplary geothermal brine power plant in which the present invention may be used to advantage.

More specifically, brine extracting stage 20, as shown in FIG. 1a, includes first and second geothermal brine extraction wells 38 and 40, by means of which geothermal brine is extracted from a common underground aquifer 42. At the wellhead, the geothermal brine contains liquid and vapor phases and may have a temperature of between about 400° F. and about 500° F. and be at a natural pressure of between about 250 psig and about 500 psig, typical temperatures and pressures being about 450° F. and about 350 psig respectively. At these high temperatures and pressures, the geothermal brine dissolves substantial amounts of minerals and elements from aquifer formation 42. In particular, the brine normally contains considerable dissolved salts (hence, the termination "brine") and may be super-saturated with silica. Moreover, the brine as extracted may contain appreciable amounts of dissolved elements such as lead, zinc, copper, iron, cadmium, silver, manganese, arsenic and antimony. Gases such as hydrogen sulfide, ammonia and carbon dioxide may be intermixed with the brine. Geothermal brine thus ordinarily comprises heavily contaminated water and may typically have a wellhead pH of about 5 to 5.5, being thereby slightly acidic.

From wells 38 and 40, the two phase brine is fed, through conduits 44 and 46 to respective first and second wellhead separators 48 and 50 which comprise separator stage 22 (FIG. 1a). In wellhead separators 48 and 50 steam and such non-condensable gases as hydrogen sulfite and ammonia which are mixed with the brine was separated from the brine.

From wellhead separators 48 and 50, the liquid brine is fed through respective conduits 52 and 54 and a common conduit 55 and a flashing valve 56 into the bottom of a high pressure flash crystallizer (HPX) 57 which together with a low pressure flash crystallizer (LPX) 58, an atmospheric flash vessel 60, a defoamer tank 62 and a defoamer pump 64 principally comprise steam production (flashing) and silica crystallization stage 24. At flashing valve 56 the brine is flashed to a reduced pressure of, for example, about 120 psig so as to convert part of the brine into steam. Within high pressure flash crystallizer 57, the two phase brine is separated, and as an illustration, for a brine flow of about 1.3 million pounds of about 450° F. and 350 psig brine per hour, about 95,000 pounds of 120 psig of steam may be produced. Such produced steam is discharged from high pressure flash crystallizer 57, through a conduit 66, into a common steam discharge conduit 68 which also receives steam, through respective conduits 70 and 72, from wellhead separators 48 and 50. Conduit 66 discharges into a first steam scrubber 74 of steam conditioning stage 26. From first scrubber 74, steam is discharged through a conduit 76 to a second (final) steam scrubber 78. Clean steam is discharged from second scrubber 78, through a conduit 80, to power generating portion 14.

In the event the quality of steam discharged through conduit 80 from second scrubber 78 does not meet power generation requirements, for example, as to the level of total dissolved solids (TDS), the steam may be vented from conduit 80, through a conduit 82, to an atmospheric vent apparatus 84. Valves 86 and 88 in respective conduits 82 and 80 control the direction of flow of the steam from second scrubber 78.

Wash water from first and second steam scrubbers 74 and 78 is discharged, through respective conduits 90 and 92, and a common conduit 94, for example, to a diffuser sump 96 (FIG. 1b). Condensed steam is returned from power generating portion 14, through a conduit 98 to a "condensate in" vessel 100 in steam generating portion 12 (FIG. 1b) for subsequent disposal.

As more particularly described below, a defoaming agent from defoamer tank 62, is pumped by pump 64, through a conduit 101 into brine conduit 55 so that the defoaming agent is mixed with the two phase brine before it is discharged into high pressure flash crystallizer.

Silicious seed material is fed, as described below, through a conduit 102, into high pressure flash crystallizer 57 from brine clarification stage 28. Within crystallizer 57, silica from the brine, which is typically super-saturated in silica as a result of reduced brine temperature and pressure, preferentially deposits or crystallizes (with other impurities) from the brine onto the seed material as a silicious deposit, the brine and seed material being circulated in crystallizer 57.

From high pressure flash crystallizer 57, liquid brine and suspended silicious material are flowed through a conduit 104 and a flashing valve 105 into the bottom of low pressure flash crystallizer 58. Across flashing valve 105, the brine is flashed to a further reduced pressure, for example, about 10 psig, to convert additional brine into steam, the two phase brine being fed into low pressure flash crystallizer for separation. For the exemplary brine flow rate mentioned above, the amount of steam separated in low pressure flash crystallizer 58 may also be about 95,000 pounds per hour. Such additional steam, which has relatively low energy content, may be discharged from low pressure crystallizer 58 through a conduit 106 into atmospheric flash vessel 60. Within low pressure flash crystallizer 58, additional silica may be deposited from the brine onto the silica particles entrained in the brine. From crystallizer 58, brine and the entrained silicious material are flowed through conduit 108 and a third flashing valve 109 at which the brine is flashed to atmospheric pressure so as to create still more steam. Steam is separated from the two phase brine in vessel 60; typically, such steam is released, through a conduit 110, into the atmosphere, but may be used for other purposes, such as facility heating. Silica removal from the brine continues to some extent in atmospheric flash vessel 60.

Brine and the entrained silicious material are discharged from vessel 60 through a conduit 112, to a recirculation-type, reactor-clarifier 114 which with a thickener 116 and a filter press 118 comprise brine clarification and stabilization stage 28. Within reactor-clarifier 114, the silicious material carried with the brine is allowed to settle from the brine as a sludge which is removed, with some brine, from the bottom of the reactor-clarifier through a conduit 120. Clarified brine, still containing small amounts of very fine silicious particulate matter, is discharged from the reactor-clarifier through a conduit 122 to a first filter pump 124. Wet silicious sludge is discharged, through conduit 120, to sludge thickener 116, in which much of the brine is removed from the sludge. De-watered sludge is discharged from thickener 116, through a conduit 126, to a sludge pump 128. Brine from thickener 116 is discharged, through a conduit 130, to a second filter pump 132.

Sludge pump 128 pumps part of the silica sludge received through conduit 126 through conduit 102 back upstream into high pressure flash crystallizer 57 as seed material, and pumps the rest of the sludge, through a conduit 134, into filter press 118. Valves 136 and 138, in respective conduits 102 and 134, control flow of sludge from sludge pump 128. Brine from filter press 118 is flowed through a conduit 140 to a settling basin 141 (FIG. 1b). "Dry" sludge, still, however, containing some entrapped brine, is discharged from filter press 118 for additional treatment or disposal. For the mentioned brine flow rate of about 1.3 million pounds per hour, the "dry" sludge may be discharged from filter press 118 at a rate of about 500 pounds per hour (about six tons per day).

Filter pumps 124 and 132 separately pump brine from reactor-clarifier 114 and thickener 116, through respective conduits 142 and 144, into respective first and second media filters 146 and 148 (FIG. 1b), which with a backwash holding tank 150 and a backwash pump 151 comprise brine filtering stage 30.

From filters 146 and 148, filtered brine is flowed through respective conduits 152 and 153, and a common conduit 154, to a brine injection pump 156. Filtered brine is discharged from pump 156, through a common conduit 158 and conduits 160 and 162, into first and second injection wells 164 and 166, respectively, which preferably (as shown) discharge into geothermal brine aquifer 42. Pump 156 and injection wells 164 and 166 comprise injection stage 32.

Within filtering stage 30, filtered brine may be diverted from conduit 154, through a conduit 170, into backwash holding tank 150. Valves 172 and 174 in respective conduits 154 and 170 control the flow of filtered brine from filters 146 and 148. When filters 146 and 148 require backwashing, filtered brine is pumped, by backwash pump 151, through a conduit 176, from holding tank 150 and through a common conduit 178 and conduits 180 and 182 into the filters in a reverse flow direction. Backwash brine is discharged from filters 146 and 148 through conduits 184 and 186, and a common conduit 188 into settling basin 141. Valves 196, 198, 200 and 202 in respective conduits 152, 154, 184 and 186, are provided for controlling brine flow for backwashing purposes.

From "condensate in" tank 100, the condensate overflows into a condensate storage vessel or tank 208. An emergency overflow storage pond 210 is in overflow communication between condensate storage vessel 208 and brine settling basin 141. Typically, liquid from settling basin 141 is pumped by a brine pump 212, through conduits 214 and 216, back upstream to atmospheric flash vessel 60 for combining therein with brine from low pressure flash crystallizer 58.

It is to be understood that power plant 10 is shown in FIG. 1 merely by way of example and, as such, is shown simplified over an actual power plant which is understandably complex and has a great many valves, conduits, controls and the like not shown or described herein. Also, for example, a practical operating geothermal brine power plant may be expected to have more than the above-described two extraction wells 38 and 40, the two separators 48 and 50, the two media filters 146 and 148 and the two injection wells 164 and 166.

BRINE TREATMENT PROCESS

Figure 2:
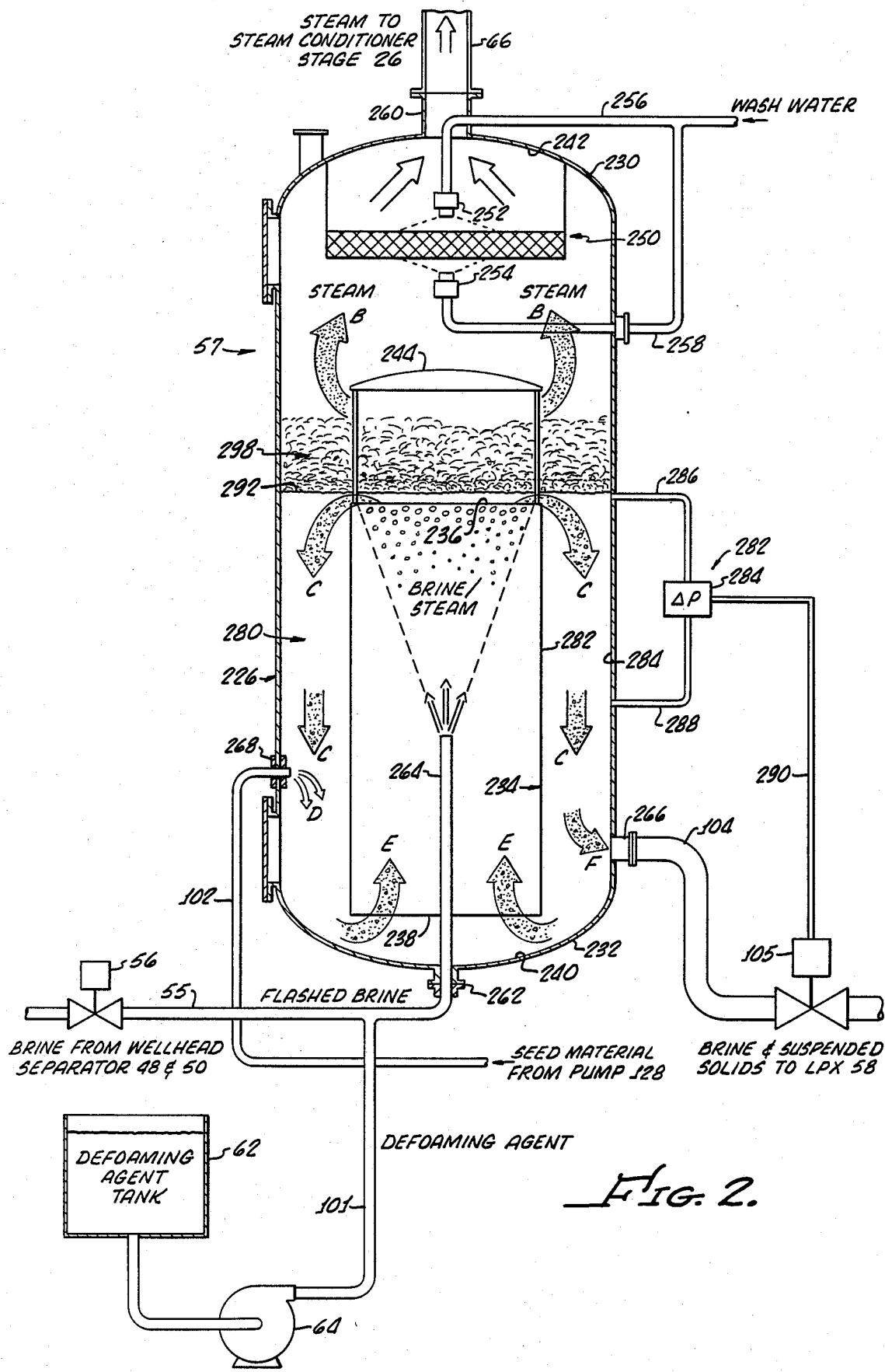
FIG. 2 is a vertical sectional drawing of a typical high pressure flash crystallizer used in the geothermal brine power plant of FIG. 1, like reference numbers being used to identify those elements and features also shown in FIG. 1.

As shown in FIG. 2, high pressure flash crystallizer 57 typically comprises a vertically oriented pressure vessel 226 having a tubular side wall 228 of circular cross section, a domed top 230 and a domed bottom 232. For the above-mentioned brine flow rate of about 1.3 million pounds per hour through steam producing portion 12, overall height of vessel 226 (and therefore of crystallizer 57) may be about 32 feet and the outside diameter thereof may be about 13.5 feet.

Coaxially mounted in lower regions of vessel 226 (by means not shown) is a vertically oriented draft tube 234 having respective open upper and lower ends 236 and 238. Consistent with the above-described size of vessel 226, draft tube 234 may be about 16 to 18 feet high and may be about 8 feet in diameter. Draft tube 234 is installed in vessel 226 so that, at closest regions, draft tube lower end 238 is about 1½ feet above an inner surface 240 of vessel bottom 232. Accordingly, draft tube upper end 236 may be about 8 to 10 feet below an inner surface 242 of vessel top 230.

Mounted in vessel 226 coaxially with draft tube 234 and about 4 feet above draft tube upper end 236 is a dome-shaped splash deflector 244. Diameter of deflector 244 is preferably about equal to the diameter of draft tube 234. Conventional steam demisting means 250 are installed in vessel 226 across the vessel and about midway between deflector 244 and vessel top 230. There may be mounted above and below demisting means 250 respective water spray nozzles 252 and 254 which are fed water from water conduits 256 and 258, respectively.

Located at the center of vessel top 230, above demisting means 250, is a steam outlet port 260 to which steam outlet conduit 66 is connected. A brine inlet port 262, to which is connected brine conduit 55, is located at the center of vessel bottom 232. Extending upwardly from brine inlet port 262, into and coaxially with draft tube 234, is a brine discharge conduit 264 which may be about 8 or 9 feet long (high) so as to extend about half way up draft tube 234.

A brine outlet port 266, to which is connected brine outlet conduit 104, is located through the side of vessel wall 228, near bottom 232. A seed material inlet port 268 is located through the side of vessel side wall 228 about opposite to brine outlet port 266. Seed material conduit 102 is connected to seed material port 268. Liquid brine is accordingly discharged from high pressure flash crystallizer 57 through port 266 from an annular region 280 between an outer surface 282 of draft tube 234 and an inner surface 284 of vessel wall 228. Seed material is introduced into such annular region 280 through seed material inlet port 268. Width of annular region 280 may be about 33 inches, the height of the region extending to upper end 236 of draft tube 234.

Operatively associated with flash crystallizer 57 are differential pressure means 282 and a flow control valve which is preferably flashing valve 105, the latter being, as above-described, installed in brine conduit 104 downstream of such flash crystallizer. Included in differential pressure means 282 is a control 284 which is connected to respective upper and lower fluid conduits 286 and 288, these conduits being connected at different elevations through vessel side wall 228. A control conduit or line 290 extends from control 284 to valve 105 to provide operating control thereof. Differential pressure means 282 and valve 105 operate together to maintain a brine surface 292 in high pressure flash crystallizer 57 at a preselected level, as determined by the pressure difference between conduits 286 and 288, the valve being caused to close more and restrict brine flow through conduit 104 in the event brine level drops below the preselected level and to cause the valve to open more when the brine level rises above the preselected level. Typically, such high pressure flash crystallizers as crystallizer 57 are usually designed for operation with the brine height at about the top of draft tube 234.

During the operation of steam generating portion 12, hot, pressurized, two phase brine is flowed, through conduit 264, from inlet conduit 55 into draft tube 234 of crystallizer 57. Because of brine inlet velocity and the steam bubbles in the flashed brine, the two phase brine discharged from conduit 264 flows upwardly (direction of arrows A, FIG. 2) through draft tube 234. At a brine surface 292, steam escapes from the brine and flows upwardly (direction of arrows B) through demisting means 250 to outlet port 260. After overflowing draft tube upper end 236, the brine then flows downwardly (direction of arrows C) through annular region 280 surrounding the draft tube, thereby becoming intermixed with the silicious seed material introduced into the annular region through inlet port 268 (direction of arrow D). The brine and seed material are recirculated around the draft tube lower end 238 (direction of arrows E) and back up inside of draft tube 234, principally by the difference in liquid head as a result of the two phase mixture in the draft tube.

The intermixing of the brine and seed material in flash crystallizer 57 enables silica from the brine, which is typically supersaturated with silica as a result of reduced brine temperature and pressure, to deposit or crystallize onto the seed material. It is intended, because of the very large surface area presented to the brine by the seed material, that most of the silica leaving the solution in the brine be deposited on the seed material instead of upon the inner surfaces of the crystallizer, for example, on inner surfaces 240, 282, and 284. Brine and suspended silicious material formed on the seed materially are discharged (direction of arrow F) from crystallizer 57, after an intended residence time of about 5-10 minutes, through outlet conduit 266 and into conduit 104 and then through flashing valve 105 to low pressure flash crystallizer 58.

The present inventors have, however, unexpectedly discovered that a thick layer 298 of foam typically forms above brine surface 292 in high pressure flash crystallizers, such as crystallizer 57. Foam layer 298 has been found to be several feet thick and is, in any event, sufficiently thick that when brine surface 292 is at a design level about even with draft tube upper end 236, the allowable TDS concentration (which may, for example, be about 50 parts per million) in steam discharged through vessel port 260 is typically exceeded. Moreover, chloride concentrations in the steam may be abnormally high, even if no specific, allowable chloride concentration level may be applied.

Such excessive TDS and high chloride concentrations in the high pressure flash crystallizer steam is apparently caused by excessive brine carryover into the steam. However, prior to the discovery by the present inventors of thick foam layer 298 being produced in high pressure flash crystallizer 57, the cause of brine carryover into the steam, when the brine was at the design level of the draft tube upper end 236, was unknown. However, it was considered by some that the carryover was inherent to the flash crystallizer design, possibly due to violent boiling action of the brine in the separation process. Now, however, it appears evident that the excessive brine carryover at design brine levels is caused by the carryover of more foam into the produced steam than can be removed by demisting means 250 and the water spray from nozzles 252 and 254.

Accordingly, it had previously been generally assumed and accepted that excessive brine carryover into the steam discharged from existing high pressure flash crystallizer 57 could only be avoided by lowering the brine level in the vessel to substantially below draft tube upper end 236 or by increasing the vessel height above the top of the draft tube. It is to be noted, however, that the thick layer of foam in crystallizer 57 has typically caused the pressure difference measurements made by control means 282 and used to control downstream valve 105, to be in error so that the actual brine level in high pressure flash crystallizer has generally been lower than the "measured" brine level.

Although reduction of brine level in crystallizer 57 to substantially below draft tube upper end 236 has not appeared, as might be expected, to significantly increase the silica concentration level in brine discharged through port 260, it has been determined that the scaling rate of inner surfaces of crystallizer 57 was excessively high, being, for example, between about 4 and about 7 inches per year. Such high scaling rates result in substantial equipment down time and high descaling costs. It was determined by the present inventors that the brine circulation rate (which may be expressed in gallons per minute) in crystallizer 57 greatly affects the rate of silicious scale build up on vessel inner surfaces, and that the brine circulation rate is directly proportional to brine height in the vessel. Moreover, it was determined that when the brine level in crystallizer 57 is maintained at about the draft tube upper end 236, the scaling rate on inner surfaces of the crystallizer could be reduced to an acceptable 1 or 2 inches a year. It is thus presently considered that good brine circulation in crystallizer 57 acts to keep the suspended silicious materials from depositing onto the crystallizer inner walls. Also, the number of reactive silica-to-particle collisions is increased relative to the number of reactive silica-to-wall collisions, thereby resulting in less silica deposition onto the vessel walls.

Of course, as above-mentioned, when the brine level in crystallizer 57 was maintained at draft tube upper end 236, there previously occured excessive brine carryover, now known to be caused by the foaming of the brine, into the produced steam, as measured by concentration levels of TDS and chlorides in the steam.

To reconcile the diverging requirements of maintaining a relatively low brine level in the crystallizer to prevent brine carryover into the produced steam and of maintaining a relatively high brine level to provide good brine circulation and a low rate of vessel scaling, some new-design, high pressure flash crystallizers have been proposed or constructed to be substantially higher than present flash crystallizers of comparable capacity. Such taller crystallizers provide a higher free space above draft tubes of conventional height. A thick layer of foam can be accommodated in such new crystallizers, but at greatly increased crystallizer cost.

Furthermore, the present inventors have discovered that a surprisingly small amount of defoaming agent added, by pump 64 from tank 62 to the brine in high pressure flash crystallizer 57, preferably upstream thereof, is effective in substantially reducing and, in fact, virtually eliminating, brine foaming in the crystallizer. Known reference sources, in contrast, indicate that effective concentrations of defoaming agents are typically between about 5 and about 10 parts per million. At such high defoamer concentrations, considering the typically great brine flow rates through brine handling portion 12 of power plant 10, the cost of any brine defoaming process would be so high as to make economical electric power production from steam produced in the high pressure flash crystallizer extremely difficult.

The present inventors have, however, determined by experimentation that the effective concentration of defoaming agents required to control foaming in high pressure flash crystallizer 57 is typically less than about 1.0 to 1.5 parts per million, with concentration of between about 0.2 and about 0.5 being usually very effective in foam control. At such unexpectedly low defoaming agent concentration levels, the brine defoaming process becomes economically practical, and use of such defoaming agents has, in fact, been initiated in an operational brine handling facility.

A further defoaming agent requirement is, however, that the agent be stable at the brine temperatures and pressures involved. Decomposition or volatilization of the defoaming agent could result in contamination of the steam produced in crystallizer 57, the upsetting of the sensitive brine clarification process in reactor-clarifier 114 and/or the enhancing of brine foaming in the crystallizer or downstream thereof. It was, for example, determined that one of the principal causes of brine foaming in high pressure flash crystallizer 57 is the bubbling of the released steam through the brine. The elevated brine temperature and pressure are also considered to be important factors in brine foam formation, since little evidence of brine foaming has been found in low pressure flash crystallizer 58 or in atmospheric flash vessel 60. Thus, the use of defoaming agents having a molecular weight of less than about 1000 has been found to enhance, rather than decrease, brine foaming in crystallizer 57, presumably by the agent volatilizing at the brine temperature and increasing the bubbling of the brine. On the other hand, it has been determined that polyglycol defoaming agents having a molecular weight greater than about 2000 or 2500 are excessively difficult to get into an aqueous solution, and are therefore, uneconomical to use.

By the addition of between about 0.2 and about 1.0 parts per million (effective) of defoaming agents, preferably inexpensive polyglycols, having molecular weights of between about 1000 and about 2000, it was found in the present case that the brine level in high pressure flash crystallizer could be operated at draft tube upper end 236 without exceeding allowable steam TDS limits and with low steam chloride levels. It was, in fact, determined that the crystallizer 57 could satisfactorily be operated with the brine level as much as about 2 feet above the draft tube upper end 236.

Thus, the addition to the brine of economically small amounts of the above described types of defoaming agents permits the providing of good quality steam by crystallizer 57, while enabling the brine level to be sufficiently high to provide good brine circulation and thereby substantially reduce silicious scaling of vessel inner surfaces contacted by the brine.

Perhaps more importantly, because of the effectiveness of the described defoaming agents in high pressure flash crystallizer 57, it has now been determined that the crystallizer can be operated at a substantially higher, steam production rate, for example, about double the steam rate, than was previously possible, while still providing good quality steam and controlling vessel scaling. Consequently, the defoaming process of the present invention enables improved design of high pressure flash crystallizers in which size can be reduced for a given steam production rate, and promises the capability of economically constructing larger, two phase separating vessels for use in higher capacity brine handling systems.

The present invention may be further described with reference to the following examples.

EXAMPLE 1

Several types of defoaming agents are laboratory screened for potential use in pilot crystallizer and crystallizer tests (EXAMPLES 2 and 3 below). For each laboratory test, a sample of about 600 ml of hot geothermal brine is placed in a tall, 1000 ml beaker. The brine is obtained from brine handling portion 12 of power plant 10, just upstream of high pressure flash crystallizer 57. The brine has a temperature of about 375° F. and has the following general composition: Sodium—60,000 parts per million (PPM), Potassium—15,000 PPM, Calcium—30,000 PPM, Iron (ferrous)—800 PPM, Manganese—900 PPM, Zinc—350 PPM, Lead—100 PPM, Chloride—170,000 PPM and Silica—350 to 500 PPM.

The effect of steam being released from the brine in high pressure flash crystallizer 57 is simulated in the laboratory experiment by bubbling a gas (air or nitrogen) upwardly through the brine in the beaker, the gas being supplied through a glass tube having a fritted disc near the bottom of the beaker. The gas is flowed through the brine at a rate causing formation, above the brine, of a thick, stable layer of foam.

When the layer of foam is stabilized above the brine in the beaker, a chemical defoaming agent is introduced into the foam layer, through a glass tube, the amount of defoaming agent required to eliminate the foam layer being measured and recorded. The experiment is repeated using an organosilicon polymer defoamer and several types of polyglycol defoaming agents, the results being shown in TABLE 1 below. It is found that polyglycol defoaming agents having molecular weights below about 1000 are not only ineffective in destroying the foam layer, but actually enhance the foaming of the brine, possibly because the low molecular weight material is volatilized at the brine temperature, the vapor or gas thereby produced enhancing the effect of the gas being bubbles through the brine. For the organo-silicon defoaming agent and for polyglycol defoaming agents having molecular weights above 1000, it is found that less than about 1 part per million of defoamer is required to eliminate the foam. In order to get these defoaming agents used in the laboratory experiment into solution, there is added to the agent polyoxyethylene oxide, glycol ether and an emulsifier in the following approximate proportions:

| Defoaming agent | 20 weight percent |
| Polyoxyethylene oxide | 2 weight percent |
| Glycol ether | 5 weight percent |
| Emulsifier | 1 weight percent |
| Water | 72 weight percent |

Defoaming agents having molecular weights above about 2000 are not tested because of the much greater difficulty of getting such defoaming agents into an aqueous solution.

TABLE 1

| Defoaming Agent | Type | Mol. Wt | Eff. Concentration (PPM) |
|---|---|---|---|
| Union Carbide LE-46 | Organo-silicon | unk. | less than 1.0 |
| Betz 205 (water base) | polyethylene glycol | 1000 | less than 1.0 |
| Betz 174 (oil base) | polyethylene glycol | 1000 | less than 1.0 |
| Carbowax PEG200 (Union Carbide) | polyethylene glycol | 200 | enhanced foaming |
| Carbowax PEG600 (Union Carbide) | polyethylene glycol | 600 | enhanced foaming |
| Carbowax PEG1000 (Union Carbide) | polyethylene glycol | 1000 | less than 1.0 |
| Polyglycol P425 (Dow) | polypropylene glycol | 425 | enhanced foaming |
| Polyglycol P1200 (Dow) | polypropylene glycol | 1200 | less than 1.0 |
| Polyglycol P2000 (Dow) | polypropylene glycol | 2000 | less than 1.0 |

EXAMPLE 2

A reduced size, upright cylindrical pilot flash crystallizer, similar to the above-described high pressure flash crystallizer 57, is constructed. The pilot crystallizer comprises a cylindrical pressure vessel having a height of about 12 feet and a diameter of about 4 feet. A draft tube (similar to draft tube 234), about 20 inches in diameter and about 6 feet high is installed in lower regions of the pilot crystallizer vessel.

A slip stream of hot, pressurized, two phase geothermal brine, having the composition described above in EXAMPLE 1, is withdrawn from brine handling portion 12 upstream of high pressure flash crystallizer 57, and is introduced into the pilot crystallizer through the draft tube thereof. A brine flow rate of about 150,000–300,000 pounds per hour is maintained, the brine having a temperature in the pilot crystallizer of about 375° F. and a pressure of about 110 psig.

Effectiveness of the defoaming agents tested in the laboratory experiment described above in EXAMPLE 1 under approximate power plant operating conditions is determined by introducing measured amounts of the defoaming agents into the brine flow into the pilot crystallizer. A series of runs, each of about 4 hours duration, are made to determine the effectiveness of each defoaming agent previously tested in the laboratory. The effective concentrations of the defoaming agents tested, except for polyglycols having molecular weights below about 1000, are found to be between about 0.2 and about 0.5 parts per million for the substantial elimination of foam in the pilot crystallizer, as determined by observations through viewing ports in the crystallizer. The results of this testing are shown below in TABLE 2, the defoaming agents being those more fully described above in TABLE 1.

TABLE 2

| Defoaming Agent | Effective Concentration (PPM) |
|---|---|
| Union Carbide LE-46 | 0.25–0.5 |
| Betz 205 (water base) | 0.25–0.5 |
| Betz 174 (oil base) | 0.25–0.5 |
| Carbowax PEG200 (Union Carbide) | Enhanced Foaming |
| Carbowax PEG600 (Union Carbide) | Enhanced Foaming |
| Carbowax PEG1000 (Union Carbide) | 0.25–0.5 |
| Polyglycol P425 (Dow) | Not tested |
| Polyglycol P1200 (Dow) | 0.25–0.5 |
| Polyglycol P2000 (Dow) | 0.25–0.5 |

The maximum allowable vapor (steam) velocity MAVV which is a measure of steam production rate in the pilot crystallizer, and as is determined by the vapor velocity at which the concentration of chlorides in the vapor is equal to about 500 parts per million, is then determined at a number of different pilot crystallizer operating pressures, both with and without use of a defoaming agent, and with the brine level maintained at the top of the draft tube. This testing is done to determine the effect of use of defoaming agents on the allowable steam production rates at various crystallizer operating pressures.

Crystallizer operating pressure is increased in steps from about 50 psig to about 200 psig, with the corresponding MAVV being determined by adjusting brine flow into the crystallizer until the chloride limit in the produced steam is reached. Each pressure step is run with and without addition of between about 0.2 and about 0.5 parts per million of defoaming agent.

It is found that at each pressure step the MAVV is about doubled by use of a defoaming agent in the noted concentration, thereby indicating that the defoaming agent is effective in reducing brine carryover into the produced steam to the extent that the steam production rate can be about doubled. The results of the test are shown in TABLE 3, below.

TABLE 3

| Crystallizer Pressure (psig) | MAVV (feet/sec.) | |
|---|---|---|
| | without defoamer | with defoamer |
| 50 | 2.1 | 4.75 |
| 100 | 1.1 | 2.2 |
| 110 | 1.0 | 2.0 |
| 150 | 0.6 | 1.2 |
| 200 | 0.35 | 0.56 |

EXAMPLE 3

Liquid and vapor phase, hot geothermal brine, at the temperature and having the composition described in EXAMPLE ONE above, is flowed at a constant flow rate of about 1.14 million pounds per hour into a high pressure flash crystallizer, corresponding to crystallizer 57. Within the flash crystallizer, steam production is maintained at a constant rate of about 70,000 pounds per hour. Pressure in the flash crystallizer is maintained at about 110 psig. The brine in the crystallizer is contacted with a defoaming agent in the amount of about 0.2 parts per million to prevent formation of foam in the crystallizer.

Different brine levels are established and maintained in the flash crystallizer by operation of a downstream control valve, corresponding to valve 105, FIG. 1. Brine circulation velocity in the crystallizer is measured at each brine level by means of a pitot tube mounted inside the crystallizer.

The brine circulation rate, in gallons per minute, is calculated from measured brine velocity for each of the brine levels established in the crystallizer and is found to increase as brine level in the crystallizer is increased. The circulation rates for different brine levels in the crystallizer is given in TABLE 4 below. Brine level is measured relative to a zero datum point at the top of the crystallizer draft tube, a minus sign (—) in such TABLE indicating a level of brine below the top of the draft tube and a plus sign (+) indicating a brine level above the top of the draft tube.

TABLE 4

| Brine Level (inches) | Brine Circulation Rate (gallons per minute) |
| --- | --- |
| −48 | 0 |
| −24 | 16,000 |
| −12 | 23,000 |
| 0 | 51,500 |
| +12 | 56,000 |
| +24 | 69,000 |

Although a preferred embodiment of the invention has been described to illustrate the manner in which the invention may be used to advantage, it is, of course, to be understood that the invention is not limited thereto, since many obvious modifications can be made by those skilled in the art, and it is intended to include within this invention any and all of such modifications as fall within the scope of the appended claims.

We claim:

1. A process for treating hot, pressurized silica-rich geothermal brine in a brine liquid-vapor phase separating vessel having a draft tube therein with a steam outlet port thereabove, the process comprising: providing a liquid level of up to 2 feet above the top of said draft tube, by,
   introducing hot, pressurized silica-rich geothermal brine into the brine liquid-vapor phase separating vessel draft tube;
   reducing the pressure of the hot, pressurized silica-rich geothermal brine within the brine liquid-vapor phase separating vessel to cause boiling of the hot, pressurized silica-rich geothermal brine and the generation of steam;
   introducing a seed material into the brine liquid-vapor phase separation vessel for causing the precipitation of silica onto the seed material;
   reducing the formation of silica scale buildup on interior surfaces of the brine liquid-vapor separating vessel and substantially increasing the production rate of steam generation by maintaining the brine level substantially above a top of the draft tube through contacting the hot, pressurized silica-rich geothermal brine with a defoaming agent.

2. The process as claimed in claim 1 wherein between about 0.2 and about 1.5 parts per million of defoaming agent is added to the hot, pressurized silica-rich geothermal brine.

3. The process as claimed in claim 1 wherein the hot, pressurized silica-rich geothermal brine in said separating vessel is at a temperature of at least about 300° F. and wherein the defoaming agent is selected as a polyglycol material having a molecular weight of at least about 1000.

4. The process as claimed in claim 3 wherein the defoaming agent has a molecular weight of less than about 2500.

5. The process as claimed in claim 1 wherein the defoaming agent is selected from the group consisting of organosilicon polymers, poly ethylene glycols, polypropylene glycols and combinations thereof.

6. The process as claimed in claim 1 wherein:
   the brine liquid-vapor phase separating vessel comprises a deflector disposed between the draft tube and the steam outlet port and the brine level in said flash crystallizer vessel is maintained at a level approximately halfway between the top of the draft tube and the deflector.

7. A process for treating hot, pressurized, silica-rich geothermal brine in a brine liquid-vapor phase separating vessel in which the brine is contacted with a seed material onto which silica is deposited from the brine so as to reduce silica scaling on inner walls of the vessel and in downstream brine handling equipment, the brine liquid-vapor separating vessel having an internal draft tube into which brine is introduced, and having a steam outlet port located at an elevation above the top of the draft tube, said process comprising providing a liquid level of up to 2 feet above the top of said draft tube, by, contacting said geothermal brine with an amount of defoaming agent causing the amount of foam formed in the vessel by the brine to be substantially reduced over that amount of foam which would otherwise be formed by the brine in the vessel in the absence of the defoaming agent to enable the establishment and maintenance of a brine level in said brine liquid-vapor phase separating vessel substantially above the draft tube top in order to cause improved natural brine circulation in the vessel and a substantial reduction in the rate of scale formation on inner walls of the vessel which would otherwise occur in the absence of improved brine circulation in the vessel.

8. The process as claimed in claim 7 wherein the brine liquid-vapor separating vessel comprises a deflector disposed between the top of the draft tube and the steam outlet port and the brine level in the brine liquid-vapor separating vessel is maintained approximately halfway between the top of the draft tube and the deflector.

9. The process as claimed in claim 8 wherein the deflector is disposed about four feet above the top of the draft tube and the temperature of the brine in said brine liquid-vapor separation vessel is at least about 300° F. and the pressure of the brine in the brine liquid-vapor separation vessel is at least about 50 psig.

10. The process as claimed in claim 9 wherein the temperature is about 375° F. and the pressure is about 110 psig.

11. The process as claimed in claim 7 wherein the defoaming agent is selected to be a polyglycol material having a molecular weight of at least about 1000.

12. The process as claimed in claim 11 wherein the defoaming agent has a molecular weight of less than about 2500.

13. The process as claimed in claim 7 wherein the defoaming agent is selected from the group consisting of polyethylene glycols, polypropylene glycols and combinations thereof.

14. The process as claimed in claim 7 wherein the defoaming agent is added to the geothermal brine in an amount of between about 0.2 and about 1.5 parts per million of defoaming agent to brine.

15. The process as claimed in claim 7 wherein the level of the brine in the vessel is established and maintained at a level at least about one foot above the height of the top of the draft tube.

16. The process as claimed in claim 15 wherein said brine level is at least about two feet above the top of the draft tube.

17. A process for treating silica-rich geothermal brine in a brine liquid-vapor phase separation vessel in which geothermal brine, having a temperature of at least about 300° F. and a pressure of at least about 50 psig, is contacted with a silicious seed material onto which silica is deposited from the brine so as to reduce silicious scaling on inner walls of the vessel and in downstream brine-handling equipment, the vessel having an internal draft tube into which liquid-vapor phase brine is introduced and having a steam outlet port located at an elevation above the top of the draft tube, and a deflector disposed therebetween, said process comprising providing a liquid level of up to 2 feet above the top of said draft tube, by, contacting said silica-rich geothermal brine with a polyglycol defoaming agent having a molecular weight of between about 1000 and 2500 and in an amount of between about 0.2 and about 1.5 parts per million of defoaming agent to brine so as to substantially reduce the amount of foam which would otherwise be formed in the vessel by the brine in the absence of defoaming agent to enable the establishment and maintenance of a brine level in the vessel substantially above the top of the draft tube for causing improved brine circulation in the vessel at a velocity which substantially reduces the rate of scale formation on inner walls of the vessel which would otherwise exist in the absence of improved brine circulation in the vessel.

18. The process as claimed in claim 17 wherein the defoaming agent is selected from the group consisting of polyethylene glycols, polypropylene glycols and combinations thereof.

19. The process as claimed in claim 18 wherein the defoaming agent has a molecular weight of between about 1000 and about 2000.

20. A process for increasing the brine circulation rate within a geothermal brine flash crystallizer having a draft tube therein with a steam outlet port thereabove, said process comprising: providing a liquid level of up to 2 feet above the top of said draft tube, by,
- introducing hot, pressurized silica-rich geothermal brine into the geothermal brine flash crystallizer through said draft tube;
- reducing the pressure of the hot, pressurized silica-rich geothermal brine within the geothermal brine flash crystallizer to generate steam;
- maintaining a brine level within the geothermal brine flash crystallizer substantially above a top of said draft tube without significant brine carryover into the steam outlet port, maintaining of the brine level being enabled by the addition of a defoaming agent into the geothermal brine flash crystallizer.

* * * * *